United States Patent

[11] 3,568,710

[72] Inventors Floyd J. Boyer;
 Eugene E. Ervin, Indianapolis, Ind.
[21] Appl. No. 856,775
[22] Filed Sept. 10, 1969
[45] Patented Mar. 9, 1971
[73] Assignee General Motors Corporation
 Detroit, Mich.

[54] BIDIRECTIONAL RESISTANCE VALVE
 2 Claims, 2 Drawing Figs.
[52] U.S. Cl. .................................................. 137/493.9,
 137/508
[51] Int. Cl. .................................................... F16k 17/26
[50] Field of Search ........................................ 137/493.9,
 506, 504, 493.8, 512, 508

[56] References Cited
 UNITED STATES PATENTS
 2,989,073 6/1961 Goodwin ..................... 137/493.8
 3,439,873 4/1969 Relf .............................. 137/493.9x FOREIGN PATENTS
1,265,783 10/1958 France ....................... 137/493.8
 816,212 7/1959 Great Britain ............... 137/504

Primary Examiner—M. Cary Nelson
Assistant Examiner—R. B. Rothman
Attorneys—Paul Fitzpatrick and Jean L. Carpenter ABSTRACT: A bidirectional resistance valve to be employed in a control line allows fluid pressure to be transmitted in either direction only when the difference in pressure from one side of the valve to the other is above a predetermined amount. The valve thus prevents minor oscillations in control pressure from being transmitted. The valve has two spring-biased diaphragms each of which has an opening which acts as a movable valve seat and cooperates with a fixed cone or needle to provide a valve which positively seats to restrain flow in one direction but which opens against a weak spring to allow flow in the other direction. The two valves are connected so that flow in either direction is possible above the small pressure determined by the respective spring.

INVENTORS
Floyd J. Boyer &
Eugene E. Ervin
BY Paul Fitzpatrick
ATTORNEY

BIDIRECTIONAL RESISTANCE VALVE

Our invention is directed to a bidirectional resistance valve and particularly to a miniature valve particularly suited for use in aircraft engine fuel control systems. The valve is of simple and rugged structure and well adapted to serve its function of preventing transmission of pressure or flow of fluid through the valve in either direction below a certain pressure but allowing flow in either direction if the threshold for that particular direction has been reached. Such a valve is useful, for example, in systems in which a controlling pressure acts upon a fuel regulating device and in which there may normally be minor fluctuations in the control pressure due to cycles of operation of the machine or for other reasons. The stability of the overall control is improved by inhibiting transmission of minor control pulses in the system. 0p The objects of our invention are to improve fuel control systems for gas turbine engines and to provide a simple miniature bidirectional resistance valve particularly suited for such control systems.

The nature of our invention and its advantages will be clearly apparent from the succeeding detailed description of the preferred embodiment of the invention and the accompanying drawings.

Figure 1:
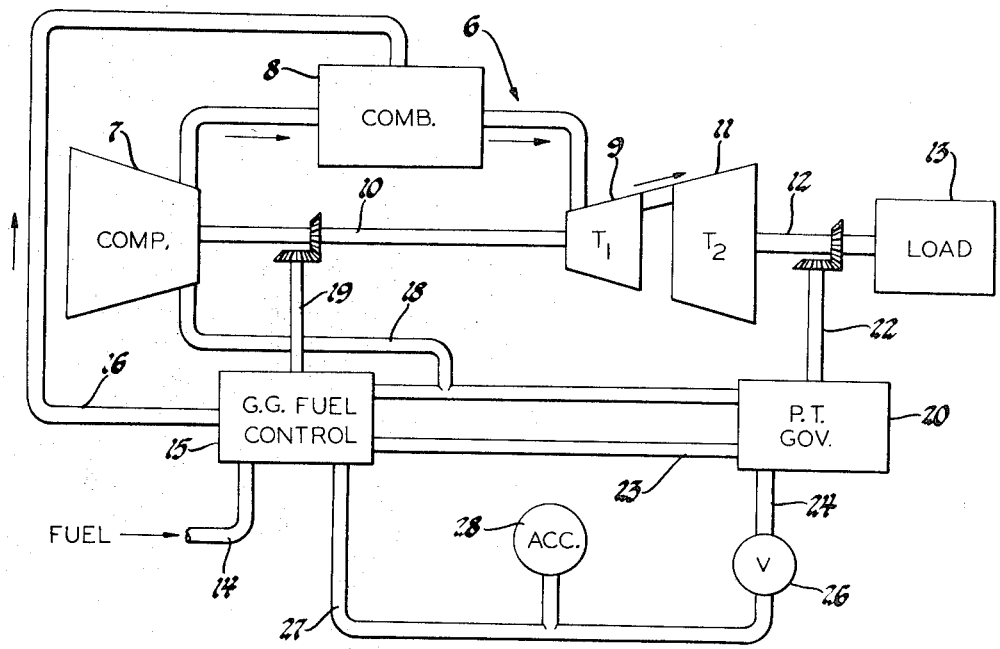
FIG. 1 is a schematic diagram of a gas turbine engine with a fuel control incorporating our resistance valve.

FIG. 1 shows a gas turbine engine and fuel control system of the general nature of that described in some detail in Bevers U.S. Pat. No. 3,332,232 for Fuel Control, Jul. 25, 1967.

For convenient reference the system is described briefly here. A gas-coupled gas turbine engine 6 comprises a compressor 7, a combustion apparatus 8, and a first or high pressure turbine 9. Turbine 9 drives compressor 7 through a shaft 10. These devices constitute a gas generator which supplies motive fluid to a second or power turbine 11 coupled through a shaft 12 to a load 13 which may, for example, be a helicopter rotor. Fuel under pressure is supplied from a suitable pump or other source through a line 14 to a gas generator fuel control 15 from which it flows through a line 16 to the combustion apparatus. The gas generator fuel control operates under manual control of power level to supply fuel as required to the gas generator. The gas generator may receive an input of compressor discharge pressure from a line 18 and an input of gas generator speed through a shaft 19.

The fuel control 15 is also under control of a power turbine governor 20 which receives an input of power turbine speed through a shaft 22. The power turbine governor includes a regulating valve which provides a regulated pressure to the fuel control through a line 23. The power turbine governor responds to overspeed of the power turbine by transmitting a pressure derived from the regulated pressure, which may be termed a control pressure, through a line 24. Line 24 could be connected directly to the fuel control 15 to override other signals to the fuel control and reduce fuel in the event of overspeed of the power turbine. In order to prevent minor oscillations of speed of the power turbine which create minor oscillations of control pressure in line 24 from causing undesired transients in the fuel control 15, a bidirectional resistance valve 26 is provided between line 24 and a second line 27 leading to the fuel control. Also, preferably, a small accumulator 28 is connected to line 27.

The valve 26 prevents any fluid flow or transmission of pressure from line 24 to line 27 or vice versa unless the pressure differential is above a predetermined value, which might in a particular instance be approximately one-half pound per square inch. It thus provides a dead band in the chain of communication from the power turbine governor to the gas generator fuel control.

The valve 26 transmits only a small control flow and therefore may be of small size and should be as compact and lightweight as possible consistent with reliability and consistency of operation.

Figure 2:
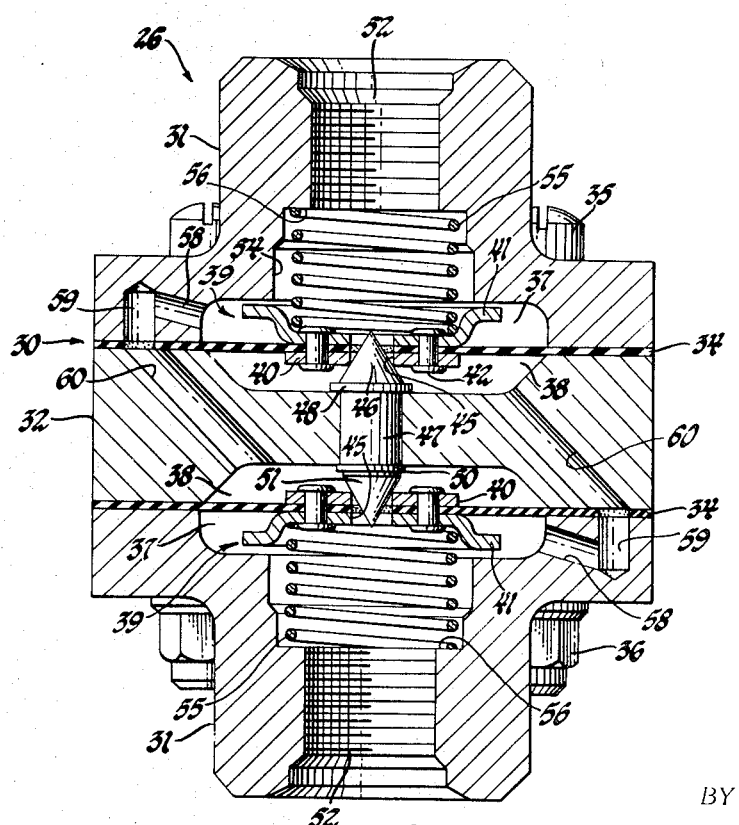
FIG. 2 is a longitudinal sectional view of the resistance valve.

The preferred structure of valve 26 is shown in FIG. 2. The valve includes a body 30 made up of three parts bolted together: two end parts 31, which may be identical, and a center part 32. The center part and end parts have peripheral face portions finished flat which abut, holding between them flexible walls 34 of suitable impermeable material which form parts of diaphragm assemblies to be described. The three parts of the body are held together by bolts 35 and nuts 36 with the flexible walls tightly clamped between them. Recesses 37 in the end parts are aligned with recesses 38 in each face of the center part 32 to define valve chambers within which the flexible walls 34 may flex.

Each diaphragm assembly 39 comprises, in addition to the flexible wall 34, a ring 40 defining a valve seat and a dished ring 41 defining a spring seat, these being fixed together by rivets 42 extending through the diaphragm. The diaphragm 39 has a central hole entirely through it of which the circular hole 45 in the valve seat ring 40 is adapted to act as a valve seat in combination with a cone or needle 46 extending along the axis of the center body part 32. The cone is preferably of constant taper, but not necessarily so.

The cone 46 may be part of a plug 47 of circular cross section closely fitted in the body part 32. Plug 47 has a shoulder 48 at one end adapted to bear against one surface of the body part 32 and has an annular groove in which a contracting snap ring 50 is mounted, this snap ring bearing against the other surface of the body part to restrain the plug against axial movement. The plug terminates in a second cone 51 which cooperates with the other valve seat ring 40 to define the second resistance valve.

A through bore 52 in each end part 31 defines an inlet for a control pressure line 24 or 27. Bore 52 communicates through an enlarged portion 54 with the flexible wall 34. A light compression spring 55 bears against a shoulder 56 in the bore and against the surface of the spring seat 41. Two intersecting drilled passages 58 and 59 in each end part connect recess 37 through a hole in the flexible wall 34 and one of two drilled passages 60 in the center part 32 with the opposite end recess 38. These passages provide for communication of pressure or flow of fluid from the back side of each diaphragm to the front side of the other diaphragm.

In the illustrated condition of the valve, with no pressure exerted or with equal pressure exerted on both ends of the valve, the diaphragms 39 are biased by the springs 55 so that the valve seats 40 are seated on the cones 46 and the valve is closed to flow in either direction. Now, if we assume the pressure to rise at the upper inlet 52 this pressure acts against the outer surface of the upper diaphragm 44 holding it more securely against the cone, but the same pressure transmitted to the inner surface of the lower diaphragm tends to move the diaphragm away from the cone and allow fluid to flow from the upper inlet 52 to the lower inlet 52. Whenever the pressure difference exerted over the effective area of the diaphragm is greater than the resistance of the spring the valve will open and allow fluid to flow, and thus pressure variations are transmitted subject to a drop in pressure due to the resistance to flow through the valve. This resistance may be of the order of one-half pound per square inch in the particular application described although, of course, it may be varied.

The threshold pressure at which either of the valves opens may be different from that of the other if desired. These threshold values may be adjusted by any suitable expedient such as insertion of shim washers between the outer end of the spring 55 and its seat 56. The particular structure described is simple and easy to machine and assemble, and is adapted to a compact structure. In the example described the effective diameter of the recesses 37 and 38 is one inch.

The detailed description of the preferred embodiment of our invention for the purpose of explaining the principles thereof is not to be considered as limiting or restricting the invention, as many modifications may be made by the exercise of skill in the art.

We claim:

1. A bidirectional resistance valve adapted to inhibit transmission of minor fluid pressure pulses in a fluid line in a control system, the valve comprising, in combination: a first body end part, a second body end part, and a body center part disposed between the end parts, the said body parts being fixed together to define a valve body with the center part defining a wall and the end parts each defining a port for connection of a fluid pressure line; two diaphragms, one mounted between each end part and the center part, each diaphragm having a through hole providing a valve seat; a fixed cone on each side of the center part engageable with the walls of the corresponding diaphragm hole to provide a valve opened and closed by reciprocation of the diaphragm; a spring confined in each end part biasing the corresponding diaphragm to seat against the corresponding cone; passages in the valve body connecting each port to the diaphragm adjacent thereto in the sense that pressure therein biases the diaphragm toward the cone; and passages in the valve body connecting each port to the diaphragm remote therefrom in the sense that pressure therein biases the diaphragm away from the cone; so that transmission of pressure and flow of fluid from either port to the other requires a threshold pressure differential determined by the physical parameters of the valve.

2. A valve as defined in claim 1 in which the fixed cones are defined by a plug extending through and fixed in the center body and having tapered ends.

PO-1050
(5/69)

UNITED STATES PATENT OFFICE
CERTIFICATE OF CORRECTION

Patent No. 3,568,710        Dated March 9, 1971

Inventor(s) Floyd J. Boyer and Eugene E. Ervin

It is certified that error appears in the above-identified patent and that said Letters Patent are hereby corrected as shown below:

Column 1, line 15, after "system." delete "Op".

Column 1, line 41, delete "level" and substitute

-- lever --.

Column 1, line 42, after "generator" (second occurrence)

insert -- fuel control --.

Signed and sealed this 14th day of May 1974.

(SEAL)
Attest:

EDWARD M.FLETCHER,JR.                  C. MARSHALL DANN
Attesting Officer                         Commissioner of Paten